(12) United States Patent
Minzioni et al.

(10) Patent No.: US 7,324,721 B2
(45) Date of Patent: Jan. 29, 2008

(54) OPTICAL COMMUNICATION LINE WITH DISPERSION INTRACHANNEL NONLINEARITIES MANAGEMENT

(75) Inventors: Paolo Minzioni, Pavia (IT);
Alessandro Schiffini, Milan (IT);
Arianna Paoletti, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/565,590

(22) PCT Filed: Jul. 24, 2003

(86) PCT No.: PCT/IT03/00455
§ 371 (c)(1),
(2), (4) Date: Sep. 8, 2006

(87) PCT Pub. No.: WO2005/011161
PCT Pub. Date: Feb. 3, 2005

(65) Prior Publication Data
US 2007/0031155 A1 Feb. 8, 2007

(51) Int. Cl.
*G02B 6/28* (2006.01)
(52) U.S. Cl. .................... 385/24; 385/15; 385/123; 359/341.1
(58) Field of Classification Search ............ 385/15, 385/24, 123
See application file for complete search history.

(56) References Cited

U.S. PATENT DOCUMENTS 6,480,658 B1   11/2002   Naito et al.

FOREIGN PATENT DOCUMENTS

EP     1 263 155 A1    12/2002

OTHER PUBLICATIONS

Kumar et al.; "Intrachannel Nonlinear Penalties in Dispersion-Managed Transmission Systems"; IEEE Journal of Selected Topics in Quantum Electronics, vol. 8, No. 3, pp. 626-631, (2002).
Zou et al.; "Limitations in 10 Gb/s WDM Optical-Fiber Transmission When Using a Variety of Fiber Types to Manage Dispersion and Nonlinearities"; Journal of Lightwave Technology, vol. 14, No. 6, pp. 1144-1152, (1996).
Park et al.; "Intra-Channel Nonlinearities and Dispersion-Management in Highly Dispersed Transmission"; IEICE Trans. Commun., vol. E86-B, No. 4, pp. 1205-1211, (2003).
G. Agrawal; "Raman-Gain Spectrum", Nonlinear Fiber Optics, Academic Press Inc., pp. 317-319, (1995).

(Continued)

*Primary Examiner*—Jennifer Doan
(74) *Attorney, Agent, or Firm*—Finnegan, Henderson, Farabow, Garrett & Dunner, L.L.P.

(57) ABSTRACT

An optical communication line of a communication system has a first processing station and an amplifying station. The line has a first optical connection having at least partially compensated accumulated dispersion and is placed between the first processing station and the amplifying station. A second optical connection having at least partially compensated accumulated dispersion is connected to the output of the amplifying station. Portions of optical fiber leaving the processing station and the amplifying station are associated to respective first order chromatic dispersions which are of opposite signs and have absolute values lower than or equal to 13 ps$^2$/Km.

22 Claims, 10 Drawing Sheets

OTHER PUBLICATIONS

M. Zitelli et al.; "Single-Channel Transmission in Dispersion Management Links in Conditions of Very Strong Pulse Broadening: Application to 40 Gb/s Signal on Step-Index Fibers", Journal of Lightwave Technology, vol. 17, No. 12. pp. 2498-2505, (1999).

T. Tsuzaki et al.; "Broadband Discrete Fiber Raman Amplifier with High Differential Gain Operation Over 1.65um-band", OFC2001, MA3-1, 3 pages, (2001).

A. Mecozzi et al.; "Analysis of Intrachannel Nonlinear Effects in Highly Dispersed Optical Pulse Transmission", IEEE Photonics Technology Letters, vol. 12, No. 4, pp. 392-394, (2000).

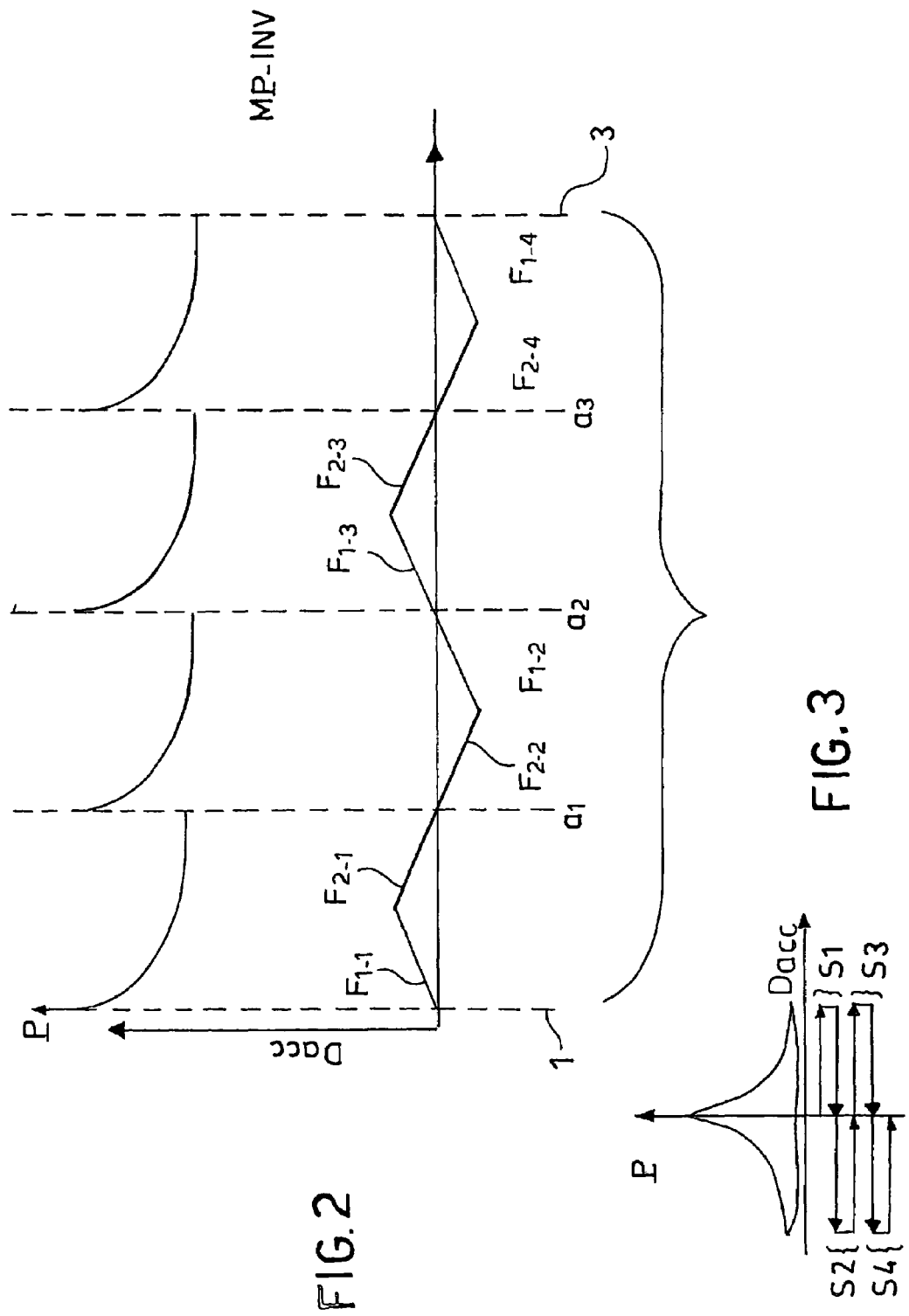

OPTICAL COMMUNICATION LINE WITH DISPERSION INTRACHANNEL NONLINEARITIES MANAGEMENT

CROSS REFERENCE TO RELATED APPLICATION

This application is a national phase application based on PCT/IT2003/000455, filed Jul. 24, 2003, the content of which is incorporated herein by reference.

BACKGROUND OF THE INVENTION

1. Field of the Invention

The present invention refers to optical communication lines which use waveguide connections, in particular, optical fiber connections. More in detail, this invention refers to dispersion compensation maps implemented by optical communication lines.

2. Description of the Related Art

Conventional optical communication systems use optical fibers which extend from a transmitting to a receiving station with repeating or amplifying stations placed at intervals comprising, for example, optical fiber amplifiers The amplifying stations amplify the strength of the optical signal they receive to enable propagation along the portion of fiber (commonly called "span") which separates the station from a subsequent amplifying station or from the receiving station.

During propagation, the optical signals may be subjected to distortion associated with non linear effects. In fact, said non linear effects may be of a considerable magnitude since they are directly correlated to the strength of the optical signal kept, typically, at high levels by means of the amplifying stations.

In the case of long distance digital transmission (for example, in the order of hundreds of km) such as, for example, transmissions which use return to zero RZ or non-return to zero NRZ modulation, this type of distortion can be particularly detrimental.

Among the non linear effects which impair optical fiber transmission, the intrachannel non linear effect is particularly detrimental. In particular, said intrachannel non linear effects are the intrachannel cross-phase modulation IXPM and the effect known as intrachannel four-wave mixing IFWM. These effects, together with the Kerr effect, lead to a distortion of the pulse transmitted on the optical fiber as a result of interaction with pulses transmitted on the same carrier wavelength and, therefore, belonging to the same channel.

Techniques to reduce or compensate non linear effects (among which the intrachannel effect) by means of appropriate chromatic dispersion maps are already known. The communication systems which use said maps are known as Dispersion Managed Systems.

The article by Shiva Kumar et al. "Intrachannel Nonlinear Penalties in Dispersion-Managed Transmission Systems" IEEE Journal of Selected Topics in Quantum Electronics, Vol. 8, No. 3, May/June 2002, describes a mathematical model of intrachannel non linear effects. The authors of this article propose, in order to reduce said intrachannel effects, the use of a dispersion map where dispersion compensation within each span is only partial, and the residual dispersion is compensated by means of the introduction of pre-compensation and post-compensation fibers, placed at the beginning and the end of an optical connection.

The article by M. Zitelli et al. "Single-Channel Transmission in Dispersion Management Links in Conditions of Very Strong Pulse Broadening: Applications to 40 Gb/s signals on step-Index Fibers" Journal of Lightwave Technology, Vol. 17, No. 12, December 1999, describes an analysis carried out on a Dispersion Managed System for single channel transmissions. In order to control propagation of the single pulse and to reduce nonlinear pulse interaction, the introduction of a prechirp is proposed, i.e. induction of dispersion in the signal to be introduced at the beginning of the span of an optical line compensated in chromatic dispersion.

The article by A. Mecozzi et al. "Analysis of Intrachannel Nonlinear Effects in Highly Dispersed optical Pulse Transmission", IEEE Photonics Technology Letters, Vol. 12, No. 4, April 2000, pages 392-394, analyzes the intrachannel nonlinear effects in high bit rate transmission systems, considering short optical pulses which are dispersion compensated and propagated in optical fibers. The authors, also quoting other studies on the subject, affirm that the magnitude of nonlinear effects can be reduced monotonically by reducing the pulse width and increasing the dispersion coefficient. In particular, this article shows how, by dispersing the pulses rapidly along the fiber, it is possible to reproduce, after an appropriate dispersion compensation, the original pulse sequence which is only slightly affected by the nonlinear effects of the fiber.

In order to further clarify the description which follows, some definitions concerning chromatic dispersion are given hereunder.

First order chromatic dispersion $\beta_2$ (hereinafter called "chromatic dispersion") is given by the following formula:

$$\beta_2 = \frac{d^2}{d\omega^2}\beta$$

corresponding to the second derivative of the propagation constant $\beta$ compared to the angular frequency $\omega$.

Dispersion in optical fiber of radiation with wavelength $\lambda$ is also indicated with the dispersion parameter D given by the expression:

$$D = -\frac{2\pi\beta_2}{\lambda^2}$$

Another parameter which characterizes the dispersion behavior of a fiber is the chromatic dispersion slope S, linked to the second order dispersion $\beta_3$ (equal to the third derivative of the propagation constant $\beta$).

Furthermore, it is pointed out that considering two connected portions of optical fibers having lengths of L1 and L2 with dispersion parameters of D1 and D2 respectively, the accumulated dispersion Dacc on the optical path L1+L2 is defined as follows:

$$Dacc = D1L1 + D2L2$$

The patent application EP-A-1263155 affirms that one of the largest factors limiting optical transmission of data in WDM systems (Wavelength Division Multiplexing) is the effect of the chromatic dispersion slope S, which is a function of the wavelength. Said patent application describes various optical transmission lines and various line portions where compensation of the dispersion D and of the dispersion slope S is carried out. In particular, transmission lines, composed of several fiber portions and configured according to various dispersion maps, are described. For the production of a transmission line portion, it is suggested to choose the length, the dispersion parameter D and the dispersion slope S of the fibers which make up the line portion in such a way that the average <S> of the dispersion slope of the optical path is zero and in such a way that the average <D> of the dispersion is different to zero. This document shows how by reducing to zero the average <S> of the dispersion slope makes these transmission lines particularly interesting for WDM systems since uniform dispersion behavior for the various channels is ensured. Among the various maps described in this document, an optical transmission line portion is presented which comprises two spans 10, each including a first fiber 12 (leaving an amplifier 16) connected to a second fiber 14 connected to the input of another amplifier 16. The fiber 12 is single mode and has a dispersion parameter equal to 16.2 ps/nm/Km, estimated at a wavelength of 1550 nm. The fiber 14 is an RDF fiber (Reverse Dispersion Fiber) which has a dispersion of −15.36 ps/nm/Km, estimated at a wavelength of 1550 nm.

Furthermore, FIG. 11 of the patent application EP-A-1263155 illustrates spans formed by the fibers 12 and 14, arranged in such a way that the fiber 12 (with positive dispersion equal to 16.2 ps/nm/Km) and the fiber 14 with negative dispersion equal to −20 ps/nm/km) are connected to the output of two successive amplifiers 16.

The Applicant observes that in the above-mentioned patent application EP-A-1263155, no mention is made of possible dispersion map configurations which could limit nonlinear effects.

The Applicant has faced the problem of supplying an optical communication line where the nonlinear effects and, in particular, the intrachannel nonlinear effects are limited.

The Applicant observes that the links existing between intrachannel nonlinear effects and dispersion are still not entirely clear and cannot be described mathematically with complete precision. This makes synthesis of Dispersion Managed Systems having a satisfactory limitation of nonlinear effects particularly difficult.

SUMMARY OF THE INVENTION

Following simulation, the Applicant surprisingly found that in order to limit intrachannel nonlinear effects, optical communication lines which use a particular type of map appear to be of considerable interest.

The type of map which the Applicant has selected is such that in two successive spans (where at least partial chromatic dispersion compensation takes place), the fibers leaving the amplifying station and/or transmission station have chromatic dispersion of opposite signs.

Furthermore, these simulations have emphasized that the limits to the intrachannel nonlinear effects, for the type of dispersion map selected, are evident for chromatic dispersion values of the first fiber of each span which are not particularly high, in absolute value.

This result is unexpected since it is in contradiction with those above-mentioned general teachings, according to which the intrachannel nonlinear effects should decrease as chromatic dispersion increases.

In particular, the simulations carried out by the Applicant have evidenced how the reduction in nonlinear effects takes place, for the optical communication line which uses the selected map and where the first fiber of each span has a chromatic dispersion equal to or lower than 13 $ps^2$/Km in absolute value.

Object of the present invention is a communication line as defined in the attached claim 1. Preferred embodiments of the communication line are defined in the attached claims from 2 to 19.

Object of this invention are also a method of manufacturing an optical communication system as described in the attached claim 20, a method for limiting the nonlinear effects as defined in the attached claim 21 and an optical communication system defined in claim 22.

For the purposes of the present invention, the expression "processing station" will mean a transmission, amplifying, add-drop or reception station of an optical system, or a node of an optical network.

BRIEF DESCRIPTION OF THE DRAWINGS

For a better understanding of the invention and its advantages, a non-limiting embodiment thereof is described below and is illustrated in the appended drawings, in which:

FIG. 2 shows, schematically, a particular form of a dispersion map which can be used by said system;

FIG. 3 shows, schematically, the symmetry introduced by the dispersion map given in FIG. 2 with a diagram of the power compared to the accumulated dispersion;

DETAILED DESCRIPTION OF THE INVENTION

Figure 1:
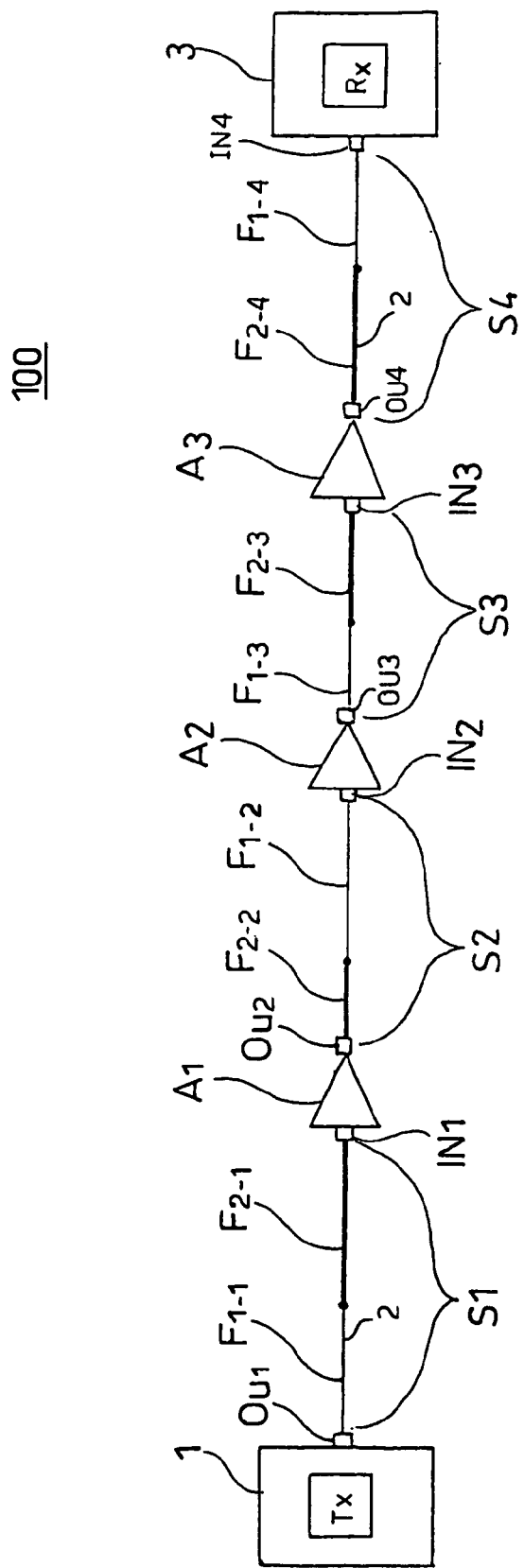
FIG. 1 shows a particular implementation of a communication system in accordance with the invention.

FIG. 1 schematically shows an optical communication system 100 which includes a waveguide communication line 2 produced, typically, in optical fiber. The system 100 comprises a transmitting station 1 to transmit optical signals on the optical fiber line 2, in its turn connected to a receiving station 3, suitable to receive said signals.

The transmitting station 1, provided with at least one transmitter Tx, is such as to perform all processing operations necessary to generate and send an information signal in the form of electromagnetic radiation on the optical fiber line 2.

The system 100 can be a single channel or multi-channel system. Accoirding to and example where the communication system 100 is a WDM system (Wavelength Division Multiplexing), the transmitting station 1 can include a plurality of transmitters Tx, each suitable to transmit signals in the form of electromagnetic radiation at optical frequencies and having a spectrum which lies around a corresponding channel wavelength.

In particular, the transmitter Tx can comprise a laser source such as, for example, a conventional semiconductor laser (not shown) for the generation of electromagnetic radiation at a pre-established wavelength. The wavelengths of the radiation which can be used in the transmission system 100 are those characteristic of optical communications. A preferred wavelength interval suitable for this invention is comprised between approximately 1200 nm and approximately 1700 nm. More preferably, the wavelength to be used is comprised between approximately 1460 nm and approximately 1650 nm and, yet more preferably, comprised between approximately 1520 nm and approximately 1630 nm.

Said laser source can be connected optically to an external optical modulator (not shown) such as, for example, an amplitude modulator to modulate the amplitude of the electromagnetic radiation to a pre-established modulation frequency. For example, the amplitude modulator is an acoustic-optical modulator or an electro-optical modulator.

As an alternative to the external modulator, the laser source can be such as to consent direct modulation (typically, in amplitude) of the radiation generated, on the basis of a modulation electrical signal supplied to the said laser source.

Typically, the transmitter Tx is provided with a pre-amplifier which gives the desired strength to the signals to be sent on the optical fiber line 2.

According to the example were the system 100 is a WDM system, the generated signals associated to a specific channel wavelength, are multiplexed, pre-amplified and connected on the optical fiber line 2. Multiplexing devices known in the sector are, for example, directional couplers, in optical fiber or integrated optics, and AWG (Array Waveguide Grating).

According to a preferred embodiment, the transmitter Tx is such as to send an amplitude-modulated digital optical signal on the optical fiber line 2.

The invention produces better effects with the use of RZ (Return to Zero) type modulation but it can also be advantageously applied to other types of modulation such as, for example, NRZ (Non Return to Zero). Furthermore, the digital optical signals sent on the optical fiber line 2 can have a high bit rate, preferably at least equal to 10 Gb/s o 40 Gb/s.

The transmission system 100 includes one or more amplifying stations (three, according to the embodiment) A1-A3 placed along the optical fiber line 2 in such a way as to divide it into a plurality of optical connections or spans S1-S4.

Each amplifying station A1-A3 is such as to process the optical radiation received to amplify its power and includes respective amplifiers, preferably optical amplifiers.

For example, in the communication system 100, EDFA amplifiers (Erbium Doped Fiber Amplifier) can be used. Said type of amplifier comprises at least one pump source to supply pump optical radiation, an erbium doped optical fiber and a coupler device to couple, in the optical fiber, the pump radiation and the optical signal to be amplified.

According to another embodiment of the invention, Raman type optical amplifiers can be used, comprising at least one pump source such as to supply pump radiation having power and wavelength such as to cause Raman type amplification in an optical fiber suitable for this type of amplification. Technical knowledge for the production of a Raman amplifier (of the distributed or concentrated type) can be found, for example, in "Non Linear Fiber Optics", Academic Press Inc. (1995), pages 317-319, by G. P. Agrawal and in the article by T. Tsusaki et. Al., "Broadband Discrete Fiber Raman Amplifier with High Differential Gain Operating Over 1.65 µm-band" OFC2001, MA3-1. According to a further embodiment of the invention, doped fiber amplifiers combined with Raman type amplifiers can be used.

The receiving station 3 includes, typically, at least one receiving amplifier and one or more receivers Rx, such as to convert the optical signal received into an electrical signal and extract the information contained in the electrical signal. Said conversion can be carried out by means of a conventional photodetector provided on the receiver Rx such as, for example, a photodiode. In the case of a WDM system, the receiving station is provided with a demultiplexer to separate the different wavelength signals propagated along the optical fiber line 2, and send them to the respective receivers Rx. Various types of conventional demultiplexers can be used similar to the above-described multiplexers.

With reference to the optical fiber line 2, each span S1-S4 of the embodiment illustrated in FIG. 1, comprises two portions of optical fibers coupled to each other and both having non zero length. According to other possible embodiments of the invention, one or more spans S1-S4 can comprise more than two portions of optical fiber connected to each other.

For the purposes of the present invention, the expressions "coupling" or "connection between two components" (for example, between stations and their input/output ports and between fibers or optical paths), shall mean that the two components are coupled optically in such a way as to enable transmission of the optical radiation from one to the other. For example, coupling or optical connection can be carried out by physically connecting the two components and/or placing between them specific optical devices (for example, lenses, mirrors, directional couplers, electro-optical and optical-electrical converters, etc.), or waveguide sections in optical fiber or by means of other technologies, such as, for example, integration on silicon substrates.

The expression "a portion of optical fiber directly connected, or directly coupled, to a component" (for example, a station output port) shall mean that the optical coupling between the fiber and the component is performed by putting the fiber and the component into direct physical contact and/or interposing optical devices (for example, a connector or a filter) or waveguide portions having an overall length and/or of accumulated dispersion negligible compared to the length of the portion of the fiber itself.

For example, the overall length of the optical path identified by the interposed devices or waveguides is considered negligible if it is less than 1% of the length of the portion of fiber connected to them.

For example, the dispersion accumulated by the interposed devices or waveguides is considered negligible compared to the dispersion of the fiber if the dispersion value accumulated in them is less than 2% or, preferably, 1%, of the dispersion accumulated in the fiber.

Advantageously, the optical fibers used for all the spans S1-S4 are of the single mode type.

The first span S1, which extends from the transmission station 1 to the first amplifying station A1, comprises a first portion in optical fiber $F_{1-1}$ coupled to a second portion in optical fiber $F_{2-1}$.

The first portion in optical fiber $F_{1-1}$, has a first input end directly coupled to an output OU1 of the transmission station 1, and a first output end coupled to a second input end of the second portion in optical fiber $F_{2-1}$. The second portion in optical fiber $F_{2-1}$ has a second output end coupled to an input IN1 of the first amplifying station A1.

The second span S2, which extends from the first A1 to the second A2 amplifying station, comprises (similarly to the first span S1) a third portion of optical fiber $F_{2-2}$ coupled to a fourth portion of fiber $F_{1-2}$.

The third portion of fiber $F_{2-2}$ is directly coupled to a second output port OU2 of the first amplifying station A1 and the fourth portion of fiber $F_{1-2}$ is directly coupled to a second input IN2 of the second amplifying station A2.

As can be seen from FIG. 1, the portions of fiber $F_{1-3}$ and $F_{2-3}$ (belonging to the third span S3) extend from a third output port OU3 to a third input port IN3, and the portions of fiber $F_{2-4}$ and $F_{1-4}$ (belonging to the fourth span S4) extend from a fourth output port OU4 to a fourth input port IN4.

In accordance with the dispersion map used, the optical fiber line 2 comprises spans having at least partially compensated accumulated chromatic dispersion Dacc. In particular, the optical fiber line 2 comprises at least two consecutive spans with at least partially compensated accumulated dispersion such as, for example, the first and the second span S1 and S2 or the second and the third span S2 and S3 or, preferably, all the spans S1-S4.

Preferably, the optical fiber line 2 comprises spans with substantially zero accumulated chromatic dispersion.

With reference to only the first span S1, the accumulated chromatic dispersion Dacc1, calculated at the end of the first span S1, can be considered substantially zero if, for example, it complies to the following relation:

$$|D_{1-1}L_{1-1}+D_{2-1}L_{2-1}| \leq 0.05 \cdot (|D_{1-1}L_{1-1}|+|D_{2-1}L_{2-1}|) \quad (a)$$

Where $D_{1-1}$ and $D_{2-1}$ are the dispersion parameters and $L_{1-1}$ and $L_{2-1}$ are the length of the first and second portions of the fibers $F_{1-1}$ and $F_{2-1}$. The chromatic dispersions $\beta 2_{1-1}$ and $\beta 2_{2-1}$ and, therefore, the parameters $D_{1-1}$ and $D_{2-1}$, are of opposite signs.

The above-described relation (a) indicates, in other words, that the accumulated dispersion in the span S1 is less than or equal to a percentage value of 5% of the accumulated dispersion which would exist if the fibers of the span S1 had chromatic dispersion of the same sign. According to other embodiments, the accumulated dispersion can be considered substantially zero if the percentage value of the relation (a) is equal to 2% or, preferably, 1%.

A relation similar to relation (a) is valid, advantageously, also for the second span S2 and, according to the embodiment described, also for the successive spans S3-S4. Furthermore, it is evident to the skilled-in-the-art how to extend the relation (a) to the spans S1-S4 which include more than two coupled fiber portions.

In an ideal case, the lengths of the two optical fiber portions $F_{1-1}$ and $F_{2-1}$ of the first span S1 are equal, and the respective chromatic dispersions are equal in absolute value but opposite in sign: $\beta 2_{1-1} = -\beta 2_{1-1}$.

In brief, the optical fiber line 2 in accordance with the invention, is such that, in at least two consecutive spans, each portion of optical fiber directly coupled to the output of the amplifying station has a chromatic dispersion of the opposite sign to that of the portion of optical fiber directly coupled to the output of the amplifying or transmission station of the span which precedes it.

In greater detail and with reference to the two consecutive spans S1 and S2, the first portion of optical fiber $F_{1-1}$ (forming part of the first span S1 and directly coupled to the transmission station 1) has a respective chromatic dispersion $\beta 2_{1-1}$ of the opposite sign to that of $\beta 2_{1-1}$ of the third portion of optical fiber $F_{2-2}$ (directly coupled to the output OU2 of the first amplifying station A1).

Furthermore, according to a particular embodiment of the invention, each amplifying station A1-A3 has respective input and output ports directly connected to portions of optical fiber which have chromatic dispersion of the same sign. For example, the chromatic dispersion $\beta 2_{2-2}$ of the second portion of fiber $F_{2-1}$ (according to the example, directly connected to the input IN1 of the first amplifying station A1) is of the same sign as the chromatic dispersion $\beta 2_{2-2}$ of the third portion of optical fiber $F_{2-2}$ (directly connected to the output OU2 of the first amplifying station A1).

In FIG. 1, the portions of optical fiber having chromatic dispersion of the same sign are represented with lines of the same thickness and, in particular, the portions $F_{1-1}$-$F_{1-4}$ with a thin line and the portions $F_{2-1}$-$F_{2-4}$ with a thicker line.

Advantageously, the portions of optical fiber directly connected to the output of the transmission station 1 and/or of the amplifying stations A1-A3, have chromatic dispersion with an absolute value (calculated on the wavelength of the radiation used for propagation) lower than a limit value $\beta_{lim}$ approximately equal to 13 ps$^2$/Km.

Furthermore, preferably, all portions of optical fiber of all the spans S1-S4 have respective chromatic dispersions in absolute value lower than or equal to the limit value $\beta_{lim}$.

According to a preferred embodiment, the limit value $\beta_{lim}$ is approximately equal to 10 ps$^2$/Km. More preferably, the limit value $\beta_{lim}$ is approximately equal to 8 ps$^2$/Km.

As will be demonstrated hereunder, the Applicant has found that said chromatic dispersion values, together with the particular dispersion map selected, have the advantage of considerably reducing nonlinear effects, in particular, of the intrachannel type.

Monomode optical fibers which have chromatic dispersion within the above intervals are, for example, optical fibers in accordance with ITU-T G655 standards. In particular, the following optical fibers, given with their brand name, can be used: FreeLight®, DeepLight®, WideLigth® produced by Pirelli and TeraLigth® produced by Alcatel.

Furthermore, the chromatic dispersion of the portions of optical fiber of the spans S1-S4 is different from zero and is greater, in absolute value, than 0.5 ps$^2$/(Km), preferably 1.0 ps$^2$/(Km), calculated in the wavelength interval considered.

It should be observed that portions of fiber forming part of separate spans may be of differing lengths and of differing chromatic dispersion.

According to a particular embodiment of the invention, the portions of optical fiber $F_{1-1}$-$F_{1-4}$, $F_{2-1}$-$F_{2-4}$ are portions of effective radiation propagation and cannot be considered of negligible length.

Furthermore, the transmission station 1, the amplifying stations A1-A3 and the optical fibers used are such that, for each portion of optical fiber directly connected to the output of the transmission or amplifying stations, the power of the optical radiation and its coefficient of non-linearity are of substantially the same value.

For example, referring only to the first and second spans S1 and S2 and for the wavelength used in propagation: the first portion of optic fiber $F_{1-1}$ has a non-linearity coefficient $\gamma_{1-1}$ and the transmission station 1 emits optical radiation at power P1. The third portion of optical fiber $F_{2-2}$ has a non-linearity coefficient $\gamma_{2-2}$ and the first amplifying station A1 emits radiation at power P2 in such a way that:

$$\gamma_{1-1}P1 = \gamma_{2-2}P2 \quad (b)$$

It should be remembered that the non-linearity coefficient $\gamma$ of an optical fiber is a parmeter which takes into account the effective area of the fiber and its non linear refractive index and it is present in the Non Linear Schrodinger Equation (NLSE) which describes pulse propagation in a fiber with loss, well-known to the skilled-in-the-art.

For example, in order to satisfy the relation (b), the two products $\gamma_{1-1}$ P1 and $\gamma_{2-2}$ P2 can be considered substantially equal if the ratio $R_{\beta p}$ between the lesser of the two products considered and the greater of the two products considered is greater than or equal to 0.3 or, preferably, 0.6.

The above relation (b) can be satisfied by configuring the system 100 in such a way that the non-linearity coefficient of $\gamma_{1-1}$ is approximately equal to that of $\gamma_{2-2}$ and that the power at the output of the transmission station 1 and of the first amplifying station A1 are approximately equal.

Preferably, at least the first portion of fiber $F_{1-1}$ and the third portion of fiber $F_{2-2}$ have respective effective areas of a value greater than or equal to 40 $\mu m^2$ and, preferably, greater than or equal to 50 $\mu m^2$.

Furthermore, some or all of the spans S1-S4 can be configured in such a way as to have an accumulated dispersion slope Sacc of substantially zero.

Alternatively, the system 100 can advantageously be provided with devices (for example, fiber or integrated optic grating) installed, for example, at the amplifying stations A1-A3 which make it possible to compensate the second order chromatic dispersion effects.

In those cases where optical fibers are used whose second order chromatic dispersion is not negligible (for example, for a communication system 100 which uses a high bit rate and several channels), it is preferable that two portions of optical fiber of consecutive spans, directly connected to the output ports of the transmission station and/or of the amplifying stations, have respective second order chromatic dispersion equal in absolute value but of opposite signs.

For example, with reference to the first and second spans S1 and S2, the second order chromatic dispersions $\beta 3_{1-1}$ and $\beta 3_{2-2}$, respectively associated to the first portion of optical fiber $F_{1-1}$ and the third portion of optical fiber $F_{2-2}$, preferably are such that:

$$\beta 3_{1-1} = -\beta 3_{2-2}$$

Preferably, the portions of fiber used in the system 100 and, in particular, those directly coupled to the output ports of the transmission station 1 and the amplifying stations A1-A3, have substantially equal attenuation coefficients. Alternatively, portions of optical fiber with different attenuation coefficients can be used, so optimizing, by means of conventional methods, the power in output from the amplifying stations.

Ideally, the consecutive portions of optical fiber directly coupled to the output ports of the transmission station 1 and/or the amplifying stations A1-A3, have exactly symmetrical characteristic parameters. In other words, with reference only to the first and third portions of optical fiber, $F_{1-1}$ and $F_{2-2}$, they preferably have equal non linearity coefficients $\gamma$, equal lengths L, first order chromatic dispersions $\beta_2$ equal in absolute value but opposite in sign and equal attenuation coefficients.

According to this case of "complete symmetry", powers P having the same value will be introduced into the spans S1-S4 by means of the transmission station 1 and the amplifying stations A1-A3.

The description given above makes it possible to produce the system 100 according to the invention even without using portions of optical fiber which have symmetrical characteristics as defined in the "complete symmetry" case, by acting on the values of the length and power used.

FIG. 2 shows an example of a dispersion map MP-INV according to the invention which can be used by the optical fiber line 2 of the transmission system 100. In particular, the dispersion map MP-INV given in FIG. 2 refers to a configuration embodiment where each span (identified by sections a1-a3 corresponding to the amplifying stations A1-A3) contains two portions of optical fiber of the same length and the same chromatic dispersion in absolute value but of opposite signs. The schematization of FIG. 2 refers to that ideal invention implementation described above as "complete symmetry".

FIG. 2 shows the flow of the accumulated dispersion Dacc along the entire optical fiber line 2 from the transmission station 1 to the receiving station 3.

It is possible to identify the type of map according to the invention using the symbol "+−AMPL−+" (or vice-versa "−+AMPL+−"), where the characters "+" and "−" refer to the chromatic dispersion signs $\beta 2$ (or the dispersion parameter) of the fibers of one span and the symbol "AMPL" indicates the presence of an amplifying station which separates two consecutive spans.

Furthermore, FIG. 2 also shows, qualitatively, the power flow along the entire optical fiber 2.

In the first span S1, the optical pulse, associated to a radiation having a power of value P, is propagated in the first portion of fiber $F_{1-1}$ accumulating a chromatic dispersion (in the example, of positive sign) which reaches a maximum value at the end of the portion itself, while the pulse power is reduced.

It is in this first portion, where the optical pulse is associated to a high power value P (set by the transmission station 1), that the non linear effects, in particular the intrachannel non linear effects, are at their highest.

The pulse is subsequently coupled to the second portion of optical fiber $F_{2-1}$ which, having a chromatic dispersion of the opposite sign to the first, reduces the previously accumulated dispersion until it reaches substantially zero at the first amplifying station A1.

It should be observed that the second portion of optical fiber $F_{2-1}$ performs the task of compensating the dispersion accumulated by the optical pulse as well as propagating the same said pulse.

The first amplifying station A1 amplifies the power of the radiation received, in such a way that it reaches a value suitable for it to be propagated in the second span S2.

Said first amplifying station A1 sends the pulse, associated to a radiation having a power value P, to the third portion of optical fiber $F_{2-2}$, which has a chromatic dispersion of the same sign as the second portion of fiber $F_{2-1}$ but opposite to that of the first portion of fiber $F_{1-1}$.

During propagation in this third portion of fiber $F_{2-2}$ the optical pulse accumulates a chromatic dispersion (in the example, of negative sign) which reaches an absolute maximum value at the end of the third portion of the fiber itself, while the power is reduced.

Furthermore, during propagation in said third portion $F_{2-2}$, where the optical pulse is associated to high power values due to the amplification action of the first station A1, it is possible to consider that the intrachannel non linear effects are of a size comparable to those generated in the first portion of optical fiber $F_{1-1}$ but such as to cause their at least partial compensation.

Similar compensation (even if the power involved is lower) is carried out by the fourth section of fiber $F_{1-2}$ on the intrachannel non linear effects accumulated in the second portion of fiber $F_{2-1}$.

During subsequent propagation in the fourth portion of fiber $F_{1-2}$ the previously accumulated dispersion decreases and is substantially reduced to zero at the input port IN2 of the second amplifying station A2.

In the successive spans S3 and S4, propagation takes place in the same way as that described for the first and second spans S1 and S2.

The embodiment described above refers to the particular case where the first fiber $F_{1-1}$ has positive chromatic dispersion and the third fiber $F_{2-2}$ has negative chromatic dispersion, but the advantages of the invention are valid also in the case the chromatic dispersion signs of said first and third fibers are the opposite to those described.

Furthermore, as can be seen in FIG. 2, the power flow can be considered, in the example given, equal within each span S1-S4.

It should be observed that the dispersion map used by the optical fiber line 2 of the communication system 100 has zones of high non linearity (i.e. the portions of fiber where high power propagation takes place) symmetrical to an accumulated dispersion axis of zero.

To this purpose, FIG. 3 illustrates this type of symmetry. The flow of power P is shown on the axis of ordinates, while the axis of abscissas represents the accumulated dispersion Dacc. In FIG. 3, the propagation of each span S1-S4 is symbolically represented by two arrows of different thicknesses which indicate the dispersion sign of the span fibers.

The graph in FIG. 3 evidences how distribution of the high power areas alternates from right to left of the axis of ordinates centered on the section of zero accumulated dispersion Dacc.

The Applicant has observed that this condition is particularly advantageous in order to reduce the influence of non linear effects and, in particular, of intrachannel non linear effects.

In particular, the Applicant has noted that by using the optical fiber line 2, the intrachannel non linear effects appear to be considerably reduced ensuring, therefore, a limited or entirely absent distortion, attributable to this phenomenon, of the pulse transmitted. This makes it possible, for example, to obtain good performance for digital transmissions of the RZ and NRZ types, even for high value launch powers which are necessary to cover considerable span lengths and/or for high bit rates used.

The communication system 100 according to the invention can be, for example, a point to point land system or an underwater system. In any case, the map used by the optical fiber line 2 can also be applied within a optical network of the mesh or ring type.

In particular, in the case the system 100 is an underwater system it is possible, thanks to the teachings of the invention, to use spans with a length greater than 40-50 km, in such a way as to reach considerable total system lengths with a limited number of amplifiers. It should be noted that underwater systems typically use spans with lengths no greater than 40-50 km due to the limitation in launch power necessary to make the non linear effects less notable.

Thanks to the teachings of the invention, it is possible to increase the launch power and the span lengths without causing problems in terms of non linear effects, in particular, intrachannel non linear effects.

It will be evident to the skilled-in-the-art that an increase in the span length in an underwater system leads to a reduction in construction costs.

The Applicant has carried out simulations on the computer to compare the performance of a communication system configured according to the invention, and similar to that illustrated in FIG. 1, with communication systems which use other types of dispersion maps. A propagation model normally used in the field and known as BPM, Beam Propagation Method, was used for the simulations.

Figure 4:
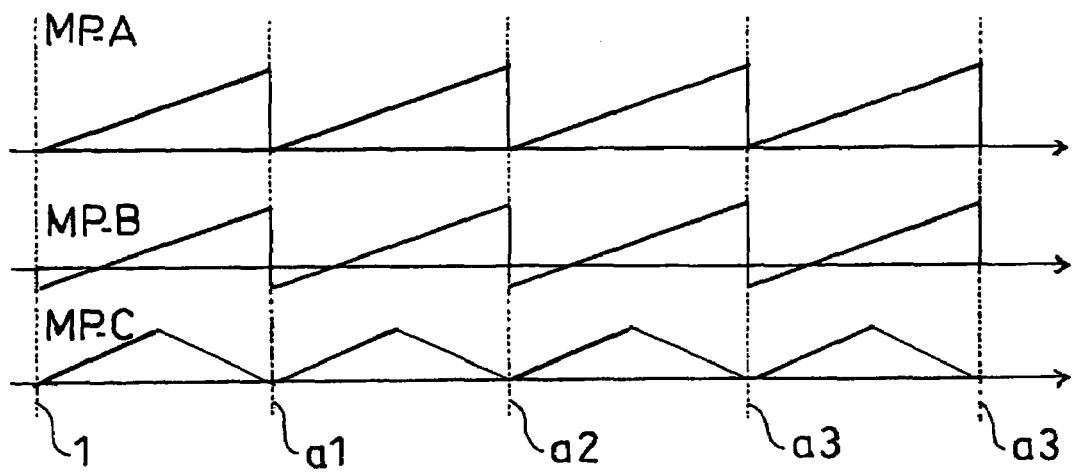
FIG. 4 shows, schematically, examples of dispersion maps according to the state-of-the-art.
Figure 5:
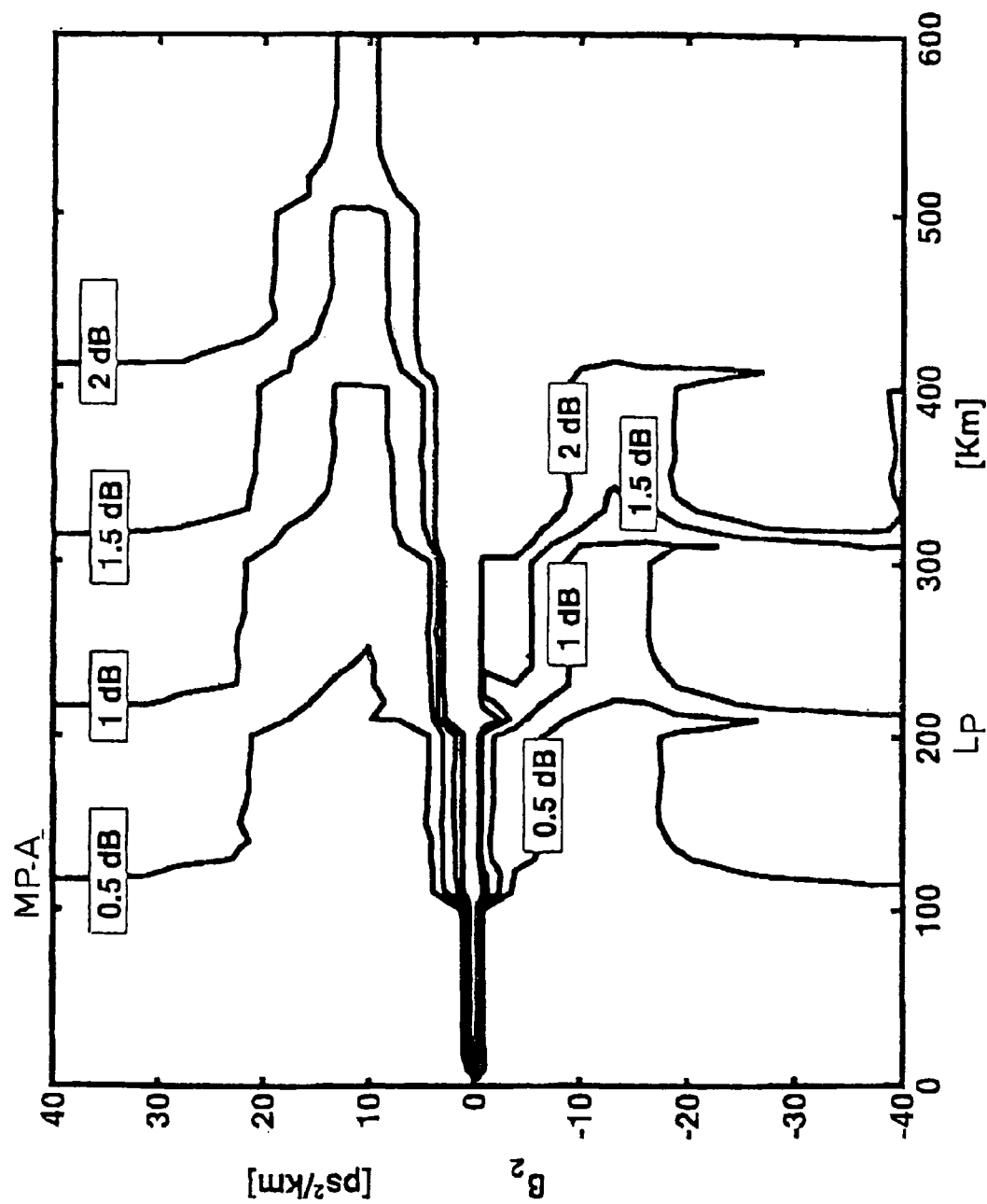
FIGS. 5-8 show diagrams of the penalty as a function of propagation distance, and of the second order chromatic dispersion for the dispersion maps given in FIG. 4 (FIG. 5-7) and for the dispersion map in accordance with the invention given in FIG. 2 (FIG. 8)
Figure 6:
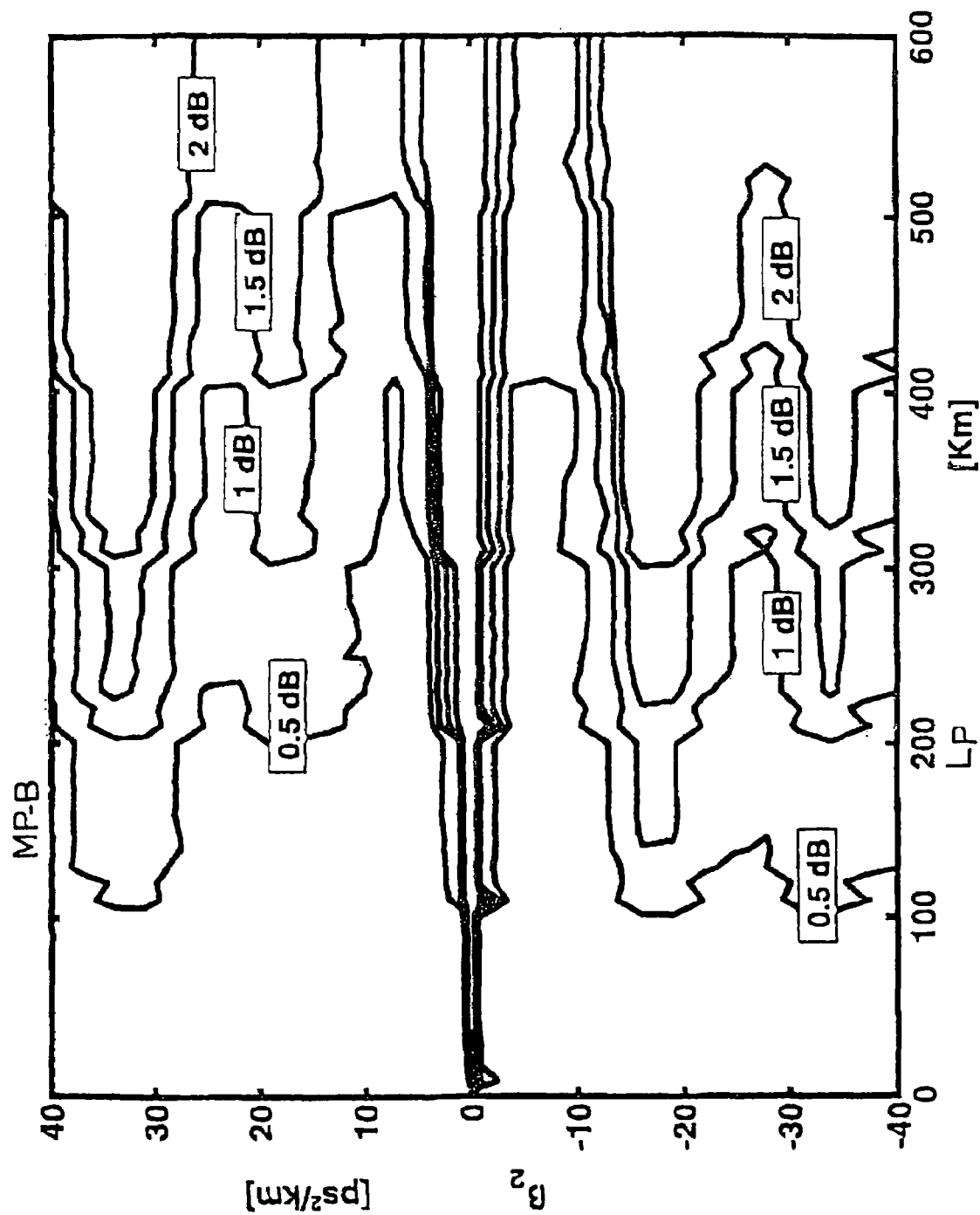
Figure 7:
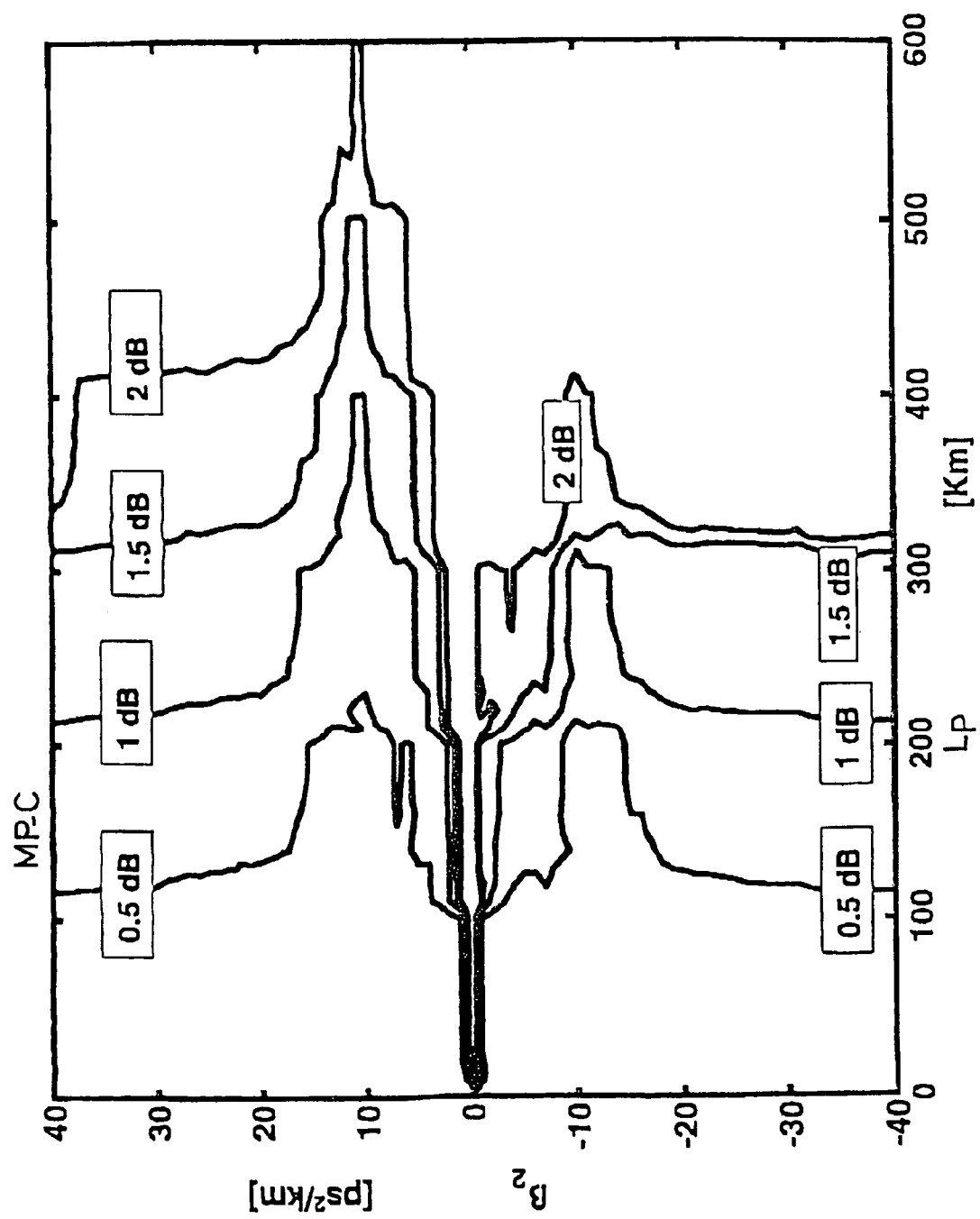

FIG. 4 shows the three dispersion maps, indicated with MP-A, MP-B and MP-C, used during the comparison and represented by means of the flow of the accumulated dispersion parameter Dacc.

In these maps, the position of the amplifying stations was indicated with the symbols a1-a3, as previously done in FIG. 2.

The first map MP-A refers to a communication system where each span (between two consecutive amplifying stations) is composed of a portion of propagation fiber having a positive dispersion parameter D (thick line) coupled to an accumulated dispersion compensation element (thin line) such as, for example, a compensation optical fiber or a compensation grating.

The map MP-B is such that pulses provided with a prechirp are introduced into every span, i.e. a suitable number of pulses dispersed by means of a fiber positioned at the transmitter.

The presence of the prechirp is represented in FIG. 4 by starting the graph from a dispersion value different from zero at the transmission station (section 1). According to map MP-B the pulse with prechirp is propagated, for each span, in an optical fiber having chromatic dispersion with a constant sign. Near each amplifying station a1-a3, accumulated dispersion compensation takes place by means of a compensation element of marginal length. A map similar to map B is described in the article by M. Zitelli et al. "Single-Channel Transmission in Dispersion Management Links in Conditions of Very Strong Pulse Broadening: Applications to 40 Gb/s signals on step-Index Fibers", already quoted above.

The map MP-C can be used in underwater systems and is an alternated dispersion map. According to the dispersion map MP-C, in each span there are two portions of fiber with chromatic dispersion of opposite signs, so as to reduce to zero the dispersion accumulated at each amplifying station a1-a3. In output from each amplifying station a1-a3, the optical fiber portions always have the same chromatic dispersion sign. It is possible to identify this type of map MP-C using the symbol "+−AMPL+−" (or vice-versa "−+AMPL−+"), where the characters "+" and "−" refer to the chromatic dispersion signs β2 (or dispersion parameter) of the fibers of a span and the symbol "AMPL" indicates the presence of an amplifying station which separates two consecutive spans.

The comparison between the system 100 which uses the dispersion map MP-INV and the systems which use the maps MP-A, MP-B, MP-C was carried out in terms of eye diagram closure.

In particular, the eye diagram penalty was analyzed, evaluating the EOP parameter (Eye Opening Penalty), given by the following expression:

$$EOP = 10 \log_{10} (A_{TX}/A_{RX})$$

Where, $A_{TX}$ is the value of the difference, evaluated at the transmission station 1, between the minimum pulse amplitude representative of bit 1 and the maximum pulse amplitude representative of bit 0. The value $A_{RX}$ represents the same difference evaluated at the receiving station 3. The size of the EOP, defined above, is a parameter conventionally used to evaluate the performance of a communication system.

The comparison between the four dispersion maps considered was carried out by simulating single channel transmissions, with identical pulse and optical radiation power characteristics. In the four cases analyzed, a communication system was considered using six spans of 100 km each, with the transmission of a RZ type signal having a bit rate equal to 40 Gb/s and a pulse with half height amplitude $T_{FWHM}$ (Full-Width-Half-Maximum) equal to 5 ps. A non linearity coefficient for all the maps equal to $\gamma=1.3$ $W^{-1}$ $Km^{-1}$ was considered for these simulations.

In order to carry out a comparison based above all on the accumulated intrachannel non linear effects, the presence of noise due to the amplifiers was excluded during simulation and the second order chromatic dispersion $\beta_3$ of the optical fibers of the system was disregarded.

The optical radiation power $P_{ou}$ at the output of the transmission station 1 and of the amplifying stations was selected at 13 dBm and the amplifying stations were presumed concentrated in one point. It should be noted that the optical power of 13 dBm is higher than values normally used in single channel communication systems. By carrying out the simulation at high power values, worse conditions are produced so as to evidence the intrachannel non linear effects.

Furthermore, during simulation it was supposed that the system 100 uses the dispersion map given in FIG. 2 in conditions of complete symmetry as defined above.

FIGS. 5, 6, 7, 8 show the results obtained for the maps MP-A, MP-B, MP-C and for the invention map MP-INV respectively.

Each of the FIGS. 5-8 represents a diagram where the axis of abscissas gives the propagation distance Lp along the entire communication system and the axis of ordinates gives the first order chromatic dispersion $\beta_2$ associated to the first optical fiber of the first span (directly connected to the transmission station), and representative, in absolute value, of the first order chromatic dispersion of all the optical fibers of the simulated system.

In all the diagrams of the FIGS. 5-8, the lines of equal Eye Opening Penalty EOP value were traced, obtained by the simulation varying the propagation distance along the communication line and the first order chromatic dispersion. The corresponding numeric value is indicated on each line.

Two EOP lines of each diagram identify a region where the penalty varies between the two coresponding values. For example, in the map MP-C of FIG. 5, the line at 0.5 dB and the line at 1 dB delimit a region where the EOP penalty is comprised within these two values.

For the dispersion maps MP-A and MP-C, it should be noted that the EOP penalty (represented by the diagram in FIGS. 5 and 7) reaches and exceeds the value of 1 dB, for all first order dispersion values, at a propagation length of approximately 400 km.

For the map MP-B (diagram in FIG. 6), the value of the EOP penalty of 1 dB was exceeded, for all the positive values of first order chromatic dispersion, after a propagation of approximately 500 km.

Figure 8:
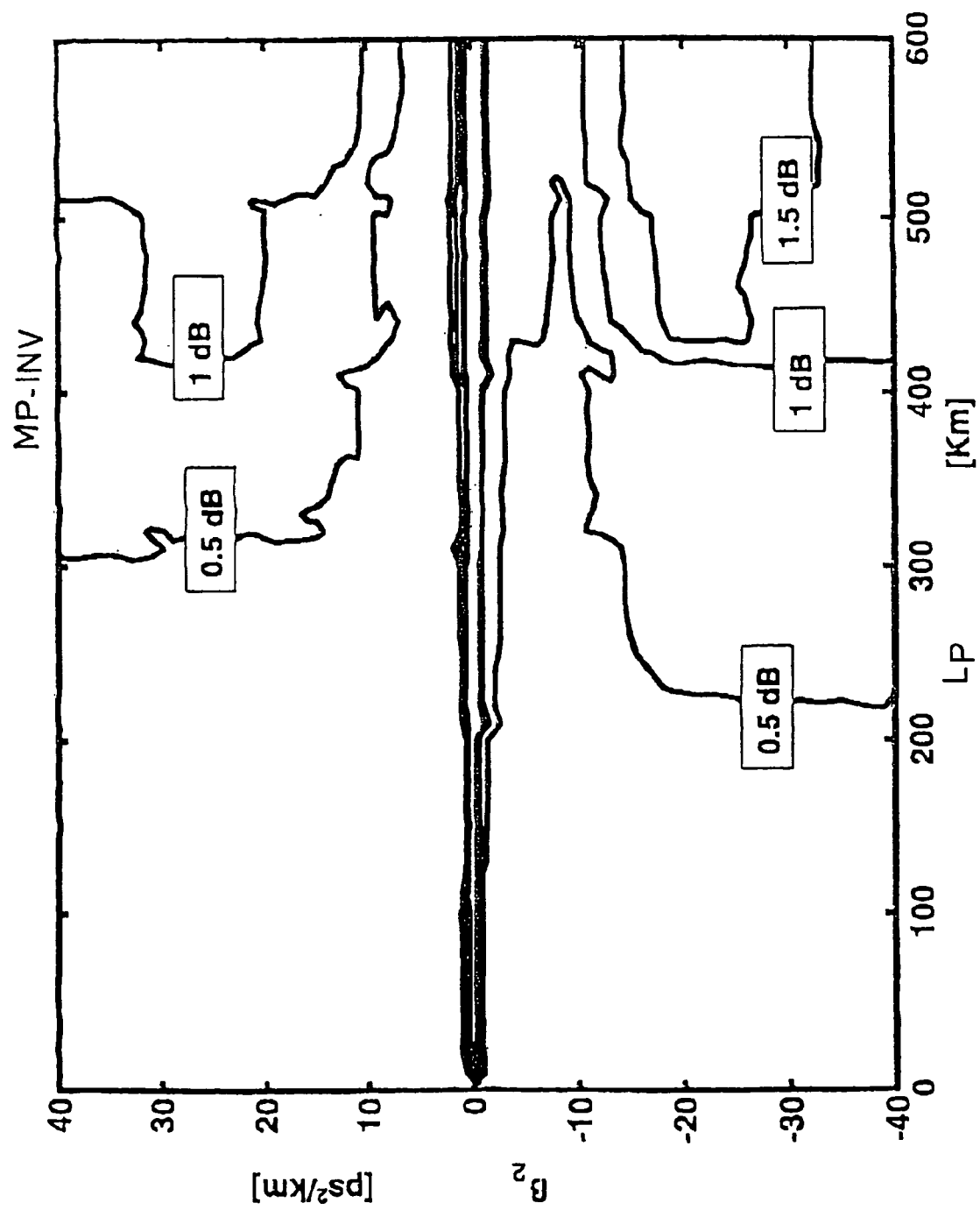

The diagram of the EOP penalty in FIG. 8, relative to the dispersion map MP-INV according to the invention, shows how, up to propagation lengths of 600 km, the EOP penalty remains below 1 dB, for first order dispersion values lower in absolute value than approximately 10 $ps^2$/Km. The higher limit value of 13 $ps^2$/Km, given above for the communication system 100, takes into account the fact that for optical launch powers below the value of 13 dBm, it is considered that the penalty values obtainable are in any case acceptable. It should be noted that the interval of first order chromatic dispersion values which makes it possible to reduce the first order non linear effects was found by the Applicant by carrying out the above described simulations. It is pointed out that the value interval found for the map was not foreseeable on the basis of existing theoretical knowledge concerning intrachannel non linear effects and their correlation to first order chromatic dispersion. In particular, on the basis of the state of the art, it was believed, contrary to the results obtained by the Applicant, that the intrachannel non linear effects decreased as the chromatic dispersion increased.

Figure 9:
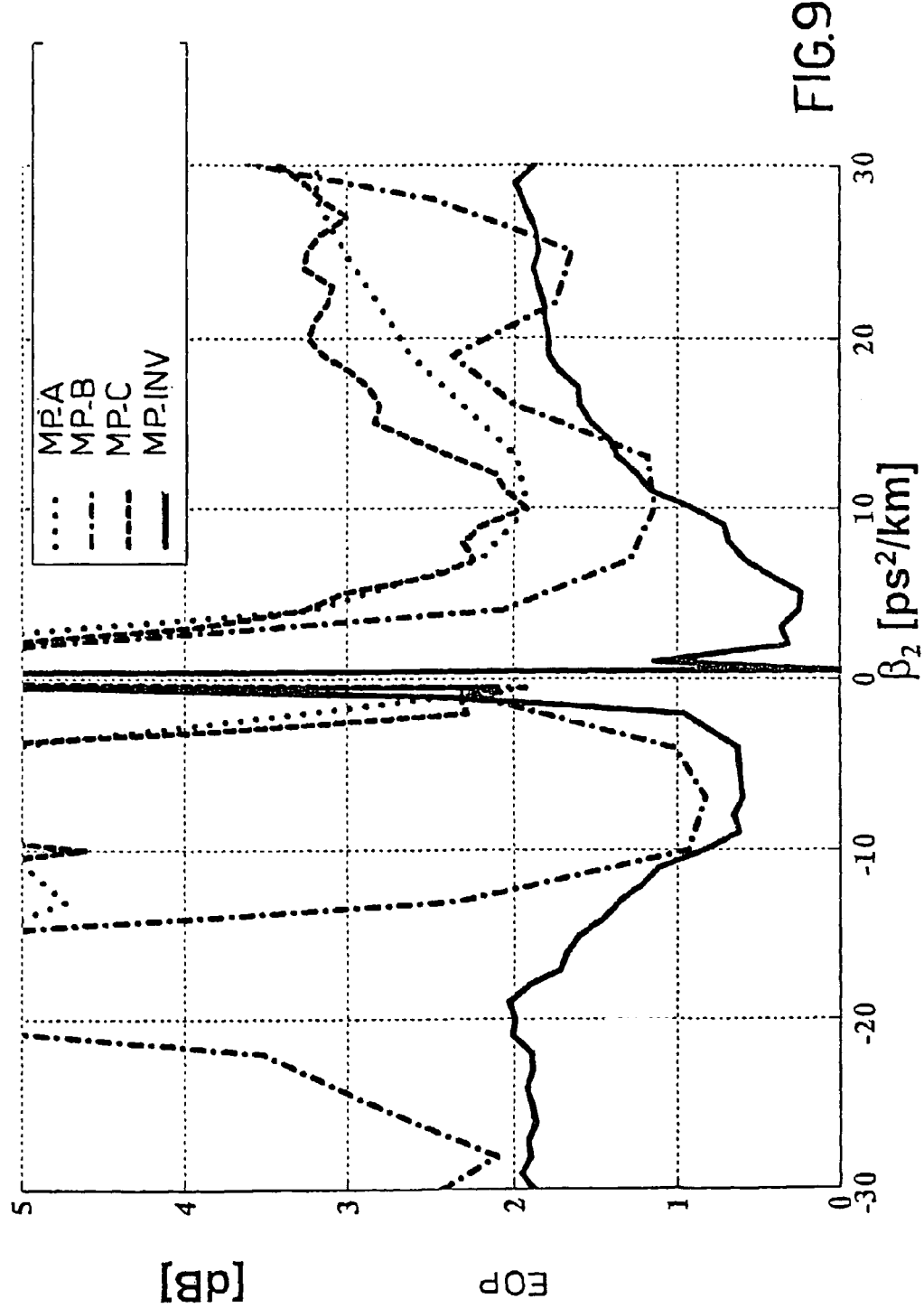
FIG. 9 shows diagrams of the penalty calculated for a propagation length equal to 600 km and relative to the dispersion maps given in FIG. 4 and FIG. 2.

FIG. 9, which refers to the same simulation as FIGS. 5-8, shows in one diagram the curves of the EOP penalty of the four maps considered (MP-A, MP-B, MP-C and MP-INV), evalauted at a propagation distance of 600 km and dependent on the first order chromatic dispersion of the first fiber of the respective communication system.

This diagram in FIG. 9 confirms how the communication system 100 which uses the map in FIG. 2 gives, for the above chromatic dispersion value interval, better performance than that obtainable with the other maps. In fact, the EOP values obtained at 600 km with the invention map MP-INV in the chromatic dispersion interval of 1-10 $ps^2$/Km are not higher than 1 dB while said value is exceeded by the. maps MP-A, MP-C for any chromatic dispersion value whatsoever.

The map MP-B, for positive values of chromatic dispersion of the first portion, has a penalty higher than 1 dB, while better results are noted for negative values and included within a particular chromatic dispersion interval (4-10 $ps^2$/Km).

It should be noted that, compared to the map MP-B, the maps of the invention have considerable advantages. In fact, the map MP-B requires an optical system provided with elements which introduce the prechirp and compensate it. This increases the complexity of the system itself and reduces flexibility since these components must be modified or replaced as the various pulse paramters vary, for example, duration, bit rate, etc. Said limitation is evidenced in the article by M. Zitelli et al. "Single-Channel Transmission in Dispersion Management Links in Conditions of Very Strong Pulse Broadening: Applications to 40 Gb/s signals on step-Index Fibers", already quoted above.

On the other hand, the system 100 which uses the maps according to the invention, as well as presenting considerable advantages connected to the reduction in intrachannel non linear effects, is structurally simpler and does not necessarily contain components which make it critically dependent on the characteristics (shape, duration, bit rate, etc.) of the pulse to be transmitted.

The Applicant also carried out another series of simulations to evaluate the performance of an optical line according to the invention. These simulations were carried out considering optical fiber parameters effectively present on the market and, therefore, referring to a real situation.

Table 1 below indicates, beside the brand name of each optical fiber used in the simulations, the symbol which will be used to identify it hereinafter, the loss attenuation, the chromatic dispersion parameter D, the dispersion slope S and the effective area $A_{eff}$.

As is already known, the dispersion slope S is correlated to the second order dispersion $\beta_3$.

TABLE 1

| Type of Fiber | SYMBOL | Loss [db/Km] | D [ps/ nm/Km) | S [ps/ ($nm^2$Km)] | $A_{eff}$ [$\mu m^2$] |
|---|---|---|---|---|---|
| FreeLight ® (Pirelli) | FL | 0.23 | 4 | 0.08 | 70 |
| TeraLight ® (Alcatel) | TL | 0.2 | 8 | 0.06 | 65 |

TABLE 1-continued

| Type of Fiber | SYMBOL | Loss [db/Km] | D [ps/nm/Km] | S [ps/(nm²Km)] | $A_{eff}$ [μm²] |
|---|---|---|---|---|---|
| DeepLight ® (Pirelli) | DL | 0.21 | −3 | 0.12 | 70 |
| WideLight ® (Pirelli) | WL | 0.21 | −6.5 | 0.07 | 55 |
| DCF Sumitomo | DCF | 0.26 | −40 | −0.12 | 25 |

The values given in Table 1 refer to a wavelength of 1550 nm.

Furthermore, it should be noted that, except for the DCF Sumitomo fiber, all the other fibers have a dispersion parameter D corresponding to a first order chromatic dispersion $\beta_2$ in absolute value lower than or equal to 13 ps²/Km.

These simulations took into consideration four different types of span, indicated with $SPANT_{T1}$-$SPAN_{T4}$ obtained with different combinations of the above-listed fibers.

Table 2 below shows the composition of each span $SPAN_{T1}$-$SPAN_{T4}$, i.e it indicates for each type which portions of fiber were considered and respective lengths. For example, the span $SPAN_{T3}$ is composed of a portion of TeraLight® (symbol TL) fiber 45 km long and a portion of WideLigth® (symbol WL) fiber 55 km long.

Furthermore, table 2 shows, for each type of span, the following calculated values (on the basis of table 1): total loss $Loss_t$, accumulated dispersion $D_{ACC}$, accumulated slope $S_{ACC}$, average dispersion $|D|_{AVG}$.

Identifying the lengths of the fiber portions with L1 and L2, and the dispersion slopes of the two fiber portions of each of the spans $SPAN_{T1}$-$SPAN_{T4}$ with S1 and S2, the accumulated slope $S_{ACC}$ is given by: S1 L1+S2 L2.

Identifying the dispersion parameter of the two fiber portions of one span with D1 and D2, the average dispersion $|D|_{AVG}$ is given, as is known, by the relation:

|D1 L1|+|D2 L2|/(L1+L2)

It should be observed that all the spans $SPAN_{T1}$-$SPAN_{T4}$ have a substantially zero accumulated chromatic dispersion.

TABLE 2

| Span | Composition [Km] | $Loss_t$ [db] | $D_{ACC}$ [ps/nm] | $S_{ACC}$ [ps/(nm²Km)] | $|D|_{AVG}$ [ps/nm] |
|---|---|---|---|---|---|
| $SPAN_{T1}$ | 43 FL + 57 DL | 21.9 | 1.0 | 10.3 | 3.4 |
| $SPAN_{T2}$ | 62 FL + 38 WL | 22.2 | 1.0 | 7.6 | 5.0 |
| $SPAN_{T3}$ | 45 TL + 55 WL | 20.6 | 2.5 | 6.6 | 7.2 |
| $SPAN_{T4}$ | 100 FL + 10 DCF | 25.6 | 0.0 | 6.8 | 7.3 |

Communication systems of the following type were considered for these simulations:
- total length equal to 600 km with six 100 km spans;
- multi-channel system having four channels centered on wavelengths in accordance with the ITU grid (International Communication Union) with spacing of 200 GHz around 1552,52 nm;
- RZ type modulation with pulse having half height amplitude $T_{FWHM}$ (Full-Width-Half-Maximum) equal to 5 ps and bit rate equal to 40 Gb/s.
- launch power in each span equal to 16 dBm (corresponding to an average power per channel of 10 dBm);
- non linear refractive index $n_2$ equal to 2.6 m²/W for all the fibers considered.

Amplification by the amplifying stations of the simulation systems was considered as concentrated in one point and ideal, in other words, without ASE (Amplified Spontaneous Emission).

The simulations made a comparison between systems which use three different types of maps having different types of span.

In greater detail, communication systems were simulated which use an alternated dispersion type map, i.e. the same type as the map MP-C in FIG. 4, but produced with three distinct types of span $SPAN_{T1}$, $SPAN_{T2}$ and $SPAN_{T3}$. With reference to the first order chromatic dispersion signs, as already said with reference to map MP-C in FIG. 4, these alternated maps all have the flow symbolically expressed with "+−AMPL+−".

Furthermore, communication systems were simulated which use a type of map according to the invention, i.e. the same type as the map MP-INV in FIG. 2, but produced with the three different types of span $SPAN_{T1}$, $SPAN_{T2}$ and $SPAN_{T3}$. With reference to the first order chromatic dispersion signs, as already said with reference to map MP-INV in FIG. 2, the maps of the invention have the flow symbolically expressed with "+−AMPL+−".

For this comparison, the EOP penalty was evaluated for the second channel of the four channels present in the systems. This enables evaluation also of pulse degeneration not only as a result of intrachannel non linear effects but also as a result of interchannel non linear effects (i.e. between one channel and the others).

It should be remembered that the interchannel non linear effects can be, for example, cross-phase modulation XPM and the phenomenon known with the term four-wave-mixing, FWM.

Figure 10:
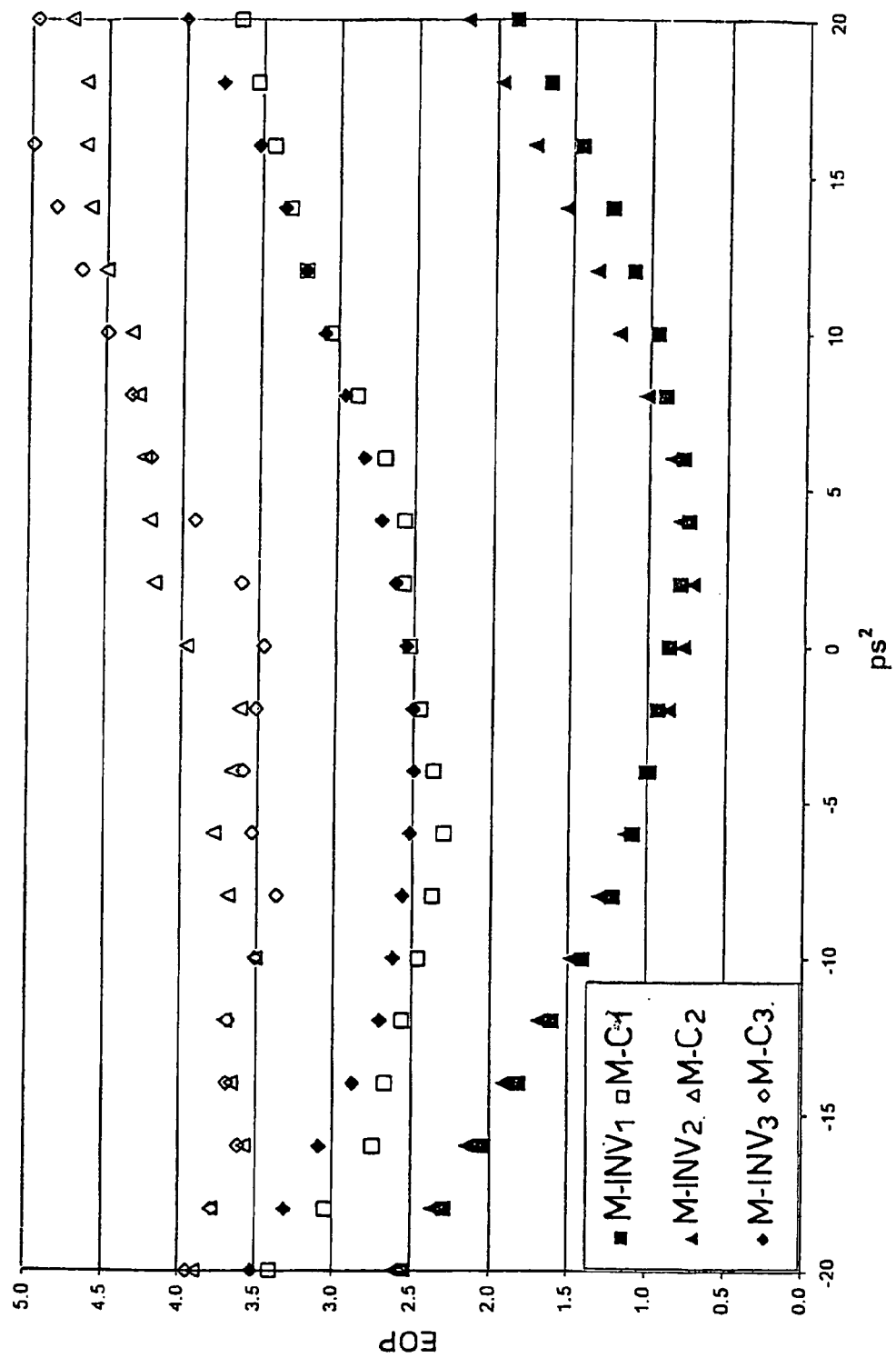
FIGS. 10 and 11 show diagrams of the penalty calculated for conventional maps and for maps according to the invention which use optical fibers existing on the market.

FIG. 10 shows the results obtained in a simulation where the EOP penalty was evaluated for systems produced according to the descriptions given above.

In particular, the following symbols were used in FIG. 10:
the symbol M-$C_i$, with "i" between 1 and 3, indicates the optical lines produced according to an alternated map ("+−AMPL+−") and which use a span of type $SPAN_{T1}$ corresponding to one of the spans $SPAN_{T1}$-$SPANT_3$;
the symbol M-$INV_i$, with "i" between 1 and 3, indicates the optical lines produced according to a map according to this invention ("+−AMPL−+") and which use a span of type $SPAN_{T1}$ corresponding to one of the spans $SPAN_{T1}$-$SPANT_3$.

For these simulations, a variable dispersion component placed at the end of each communication line was considered. The axis of ordinates of the graph in FIG. 10, represents the EOP penalty as a function of the residual ps² (obtained by means of adjusting the variable dispersion component) which the signal presents in input to a receiver placed at the end of the six spans of the optical line considered.

As can be seen in FIG. 10, each optical line M-$INV_i$ according to the invention, presents EOP values lower than those of the optical line M-$C_i$ which uses the same type of span $SPAN_{T1}$-$SPAN_{T3}$. For example, the optical line M-$INV_2$ (penalty represented in the diagram by dark triangles) gives a much better performance than the optical line (penalty represented in the diagram by white triangles), despite the fact that the two corresponding maps use the same type of optical fiber.

This simulation demonstrated how the advantages of the invention in terms of reduction in non linear effects are present even for optical lines which use a map different from the ideal one with "complete symmetry".

Figure 11:
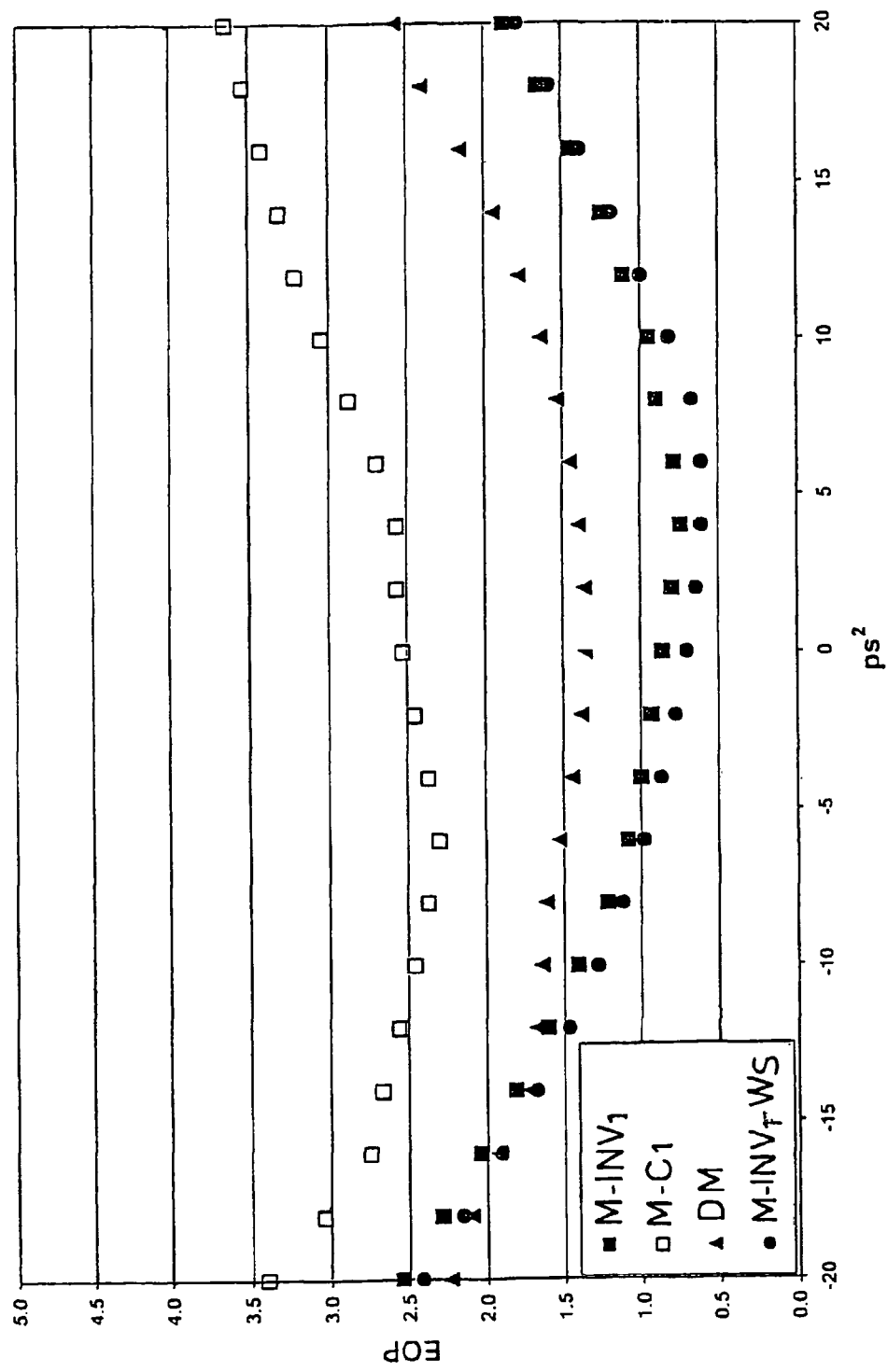

FIG. 11 shows, besides the EOP values for the lines M-C$_1$ and M-INV$_1$, also the trend of the penalties for an optical line indicated with the symbol DM, which uses the span SPAN$_{T4}$. The line DM uses, by means of six spans SPANT$_4$, a map which utilizes a prechirp and a transmitting fiber, followed by compensation fiber, similar to the map MP-B in FIG. 4.

FIG. 11 shows how the optical line M-INV$_1$, which uses a map according to the invention, gives better performance even than the line DM.

Furthermore, FIG. 11 shows EOP values evaluated for an optical line identified with the symbol M-INV$_1$-WS, which uses the span SPANT1 and utilizes a map according to the invention ("+−AMPL−+") where, in the simulation, the dispersion slope S of both fibers or, equivalently, the second order dispersion β$_3$ is to be considered zero.

The graph in FIG. 11 shows how the behavior of the optical line M-INV$_1$-WS towards the EOP penalty is very similar to that of the optical line M-INV$_1$ and that, therefore, the advantages of the invention are not strongly linked to the chromatic dispersion compensation slope S.

The invention claimed is:

1. An optical communication line comprising:
   a first optical connection with accumulated chromatic dispersion at least partially compensated and comprising:
   a first optical waveguide portion directly connectable to an output of
   a first processing station of electromagnetic radiation at a pre-established wavelength; and
   a second optical waveguide portion coupled to the first portion;
   an amplifying station provided with a first input directly connected to the second portion in order to receive the radiation and with a first output for amplified radiation;
   a second optical connection with at least partially compensated accumulated dispersion and comprising:
   a third optical waveguide portion directly connected to the first output;
   a fourth optical waveguide portion coupled to said third portion and directly connectable to a second input of a second processing station, said first and third portions being associated to respective first order chromatic dispersions having opposite signs,
   at least said first and third portions being associated to respective first order chromatic dispersions having, at the pre-established wavelength, a corresponding absolute value lower than or equal to 13 ps$^2$/Km.

2. The communication line according to claim 1, wherein at least said first and third portions are associated to respective first order chromatic dispersions having, at the pre-established wavelength, a corresponding absolute value lower than 10 ps$^2$/Km.

3. The communication line according to claim 1, wherein at least said first and third portions are associated to respective first order chromatic dispersions having, at the pre-established wavelength, an absolute value greater than 0.5 ps$^2$/Km.

4. The communication line according to claim 3, wherein at least one of said first and third portions is associated to respective first order chromatic dispersion having, at the pre-established wavelength, an absolute value greater than 1 ps$^2$/Km.

5. The communication line according to claim 1, wherein the first and the second optical connections are substantially formed by waveguide portions having, at the pre-established wavelength, first order chromatic dispersions in absolute value lower than 13 ps$^2$/Km.

6. The communication line according to claim 1, wherein said waveguide portions are substantially formed by optical fibers.

7. The communication line according to claim 1, wherein said first station is such as to send on the first portion radiation having a first power value and said amplifying station is such as to send on the third portion amplified radiation having a second power value, the first and the third portions being such that the product of a non linearity coefficient associated to the first portion and said first power value is substantially equal to the product of a nonlinearity coefficient associated to the third portion and said second power value.

8. The communication line according to claim 1, wherein the waveguides of said first portion and said third portion present effective areas of a value greater than or equal to 40 μm$^2$.

9. The communication line according to claim 8, wherein the waveguides of said first portion and said third portion present effective areas of a value greater than or equal to 50 μm$^2$.

10. The communication line according to claim 1, wherein said first and second optical connections present a substantially zero accumulated dispersion.

11. The communication line according to claim 1, wherein each of said first and second optical connections is composed of two directly coupled portions of optical fiber having chromatic dispersions of opposite signs.

12. The communication line according to claim 1, wherein said first and second optical connections include single mode optical fibers.

13. The communication line according to claim 1, wherein said first processing station is an information signal transmission station including at least one source of radiation at a wavelength suitable for propagation in optical fiber.

14. The communication line according to claim 1, wherein said second processing station is an information signal receiving station.

15. The communication line according to claim 13, wherein said transmission station is such as to generate optical pulse signals.

16. The communication line according to claim 1, wherein said first processing station is a radiation amplifying station and said second processing station is a further radiation amplifying station.

17. The communication line according to claim 1, wherein at least said first and said second optical connections have a length greater than or equal to 40 km.

18. The communication line according to claim 17, wherein said length is greater than or equal to 80 km.

19. The communication line according to claim 1, wherein said first and second optical connections present substantially zero accumulated dispersion slope.

20. A method for manufacturing an optical line for a communication system, comprising the following steps:
   providing a first processing station provided with an output for electromagnetic radiation having a pre-established wavelength;
   connecting a first input of an amplifying station to the first station to receive radiation, the amplifying station being provided with a first output for amplified radiation;
   placing a first optical connection including at least a first portion of optical waveguide directly connected to said output and a second portion of optical waveguide directly connected to the first input, said first connection having at least partially compensated accumulated chromatic dispersion;

placing a second optical connection having at least partially compensated accumulated chromatic dispersion and including a third portion of optical waveguide directly connected to the first output and a fourth portion of optical waveguide directly connectable to a second processing station; and choosing said first and third portions in such a way that they are associated to respective first order chromatic dispersions of opposite signs and an absolute value, calculated at the pre-established wavelength, lower than or equal to 13 $ps^2$/Km.

21. A method for limiting the non linear effects in an optical communication system, comprising the following steps:

supplying a first optical connection including at least a first portion of optical waveguide coupled to a second portion of optical waveguide, said first connection having at least partially compensated accumulated chromatic dispersion;

introducing electromagnetic radiation having a first wavelength in said first portion of optical waveguide;

amplifying the radiation leaving said second portion;

propagating said amplified radiation in a second optical connection having at least partially compensated accumulated chromatic dispersion and including a third portion of optical waveguide coupled to a fourth portion of optical waveguide, said first and third portions being associated to respective first order chromatic dispersions of opposite signs and a respective absolute value, calculated at the pre-established wavelength, lower than or equal to 13 $ps^2$/Km.

22. A communication system comprising:

a first processing station provided with an output for electromagnetic radiation having a pre-established wavelength;

an amplifying station provided with a first input connected to the first station to receive the radiation and with a first output for amplified radiation;

a first optical connection having at least partially compensated accumulated chromatic dispersion and including at least a first portion of optical waveguide directly connected to said output and a second portion of optical waveguide directly connected to the first input;

a second optical connection having at least partially compensated accumulated chromatic dispersion and including at least a third portion of optical waveguide directly connected to the first output and a fourth portion of optical waveguide directly connectable to a second processing station, said first and third portions being associated to respective first order chromatic dispersions of opposite signs, at least said first and third portions of fiber being associated to respective first order chromatic dispersions with an absolute value, at the pre-established wavelength, lower than or equal to 13 $ps^2$/Km respectively.

* * * * *